United States Patent [19]

Das

[11] Patent Number: 4,945,982

[45] Date of Patent: Aug. 7, 1990

[54] WIRE RACEWAY

[75] Inventor: Sathish R. Das, Indianapolis, Ind.

[73] Assignee: Carrier Corporation, Syracuse, N.Y.

[21] Appl. No.: 382,460

[22] Filed: Jul. 20, 1989

[51] Int. Cl.[5] .......................... F24F 13/12; H02G 3/00
[52] U.S. Cl. .................................... 165/125; 174/72 A
[58] Field of Search ............. 165/122, 125; 174/72 A;
417/423.1, 423.14, 423.5, 424.1

[56] References Cited

U.S. PATENT DOCUMENTS

| 3,151,905 | 10/1964 | Reuther et al. | 174/72 A |
|---|---|---|---|
| 4,036,292 | 7/1977 | Hine, Jr. | 165/122 |
| 4,202,409 | 5/1980 | Cann et al. | 165/125 |
| 4,391,322 | 7/1983 | Ciarlei et al. | 165/125 |
| 4,392,525 | 7/1983 | O'Mara et al. | 165/125 |

FOREIGN PATENT DOCUMENTS

| 2201211 | 3/1978 | Fed. Rep. of Germany | 174/72 A |
|---|---|---|---|
| 2714885 | 10/1978 | Fed. Rep. of Germany | 174/72 A |
| 2290063 | 5/1976 | France | 174/72 A |

OTHER PUBLICATIONS

Mitchell, A., Raczek, T. A., Sadowitz, P., Wiktorek, R. J., "Cable Enclosure", IBM Technical Disclosure Bulletin, vol. 12, No. 12 (May 1970), p. 2293.

Primary Examiner—John Rivell
Assistant Examiner—L. R. Leo
Attorney, Agent, or Firm—Dana F. Bigelow

[57] ABSTRACT

A wire raceway member, for containing the wires which extend between a fan motor and its separate control module, is formed of a lower U-shaped portion and an upper expandable portion. An opening in the expandable portion is normally smaller than the diameter of the wires to be contained but, when temporarily expanded, the width is wider than the diameter of the wires so as to enable the insertion of the wires into the slot. The ends of the raceway have integrally formed members that are attachable to the motor and to the orifice ring, respectively, without fasteners. A radially extending portion of the grille cover is aligned with the top slot of the raceway member so as to thereby act as a cover to prevent the inflow of moisture into the raceway member.

8 Claims, 2 Drawing Sheets

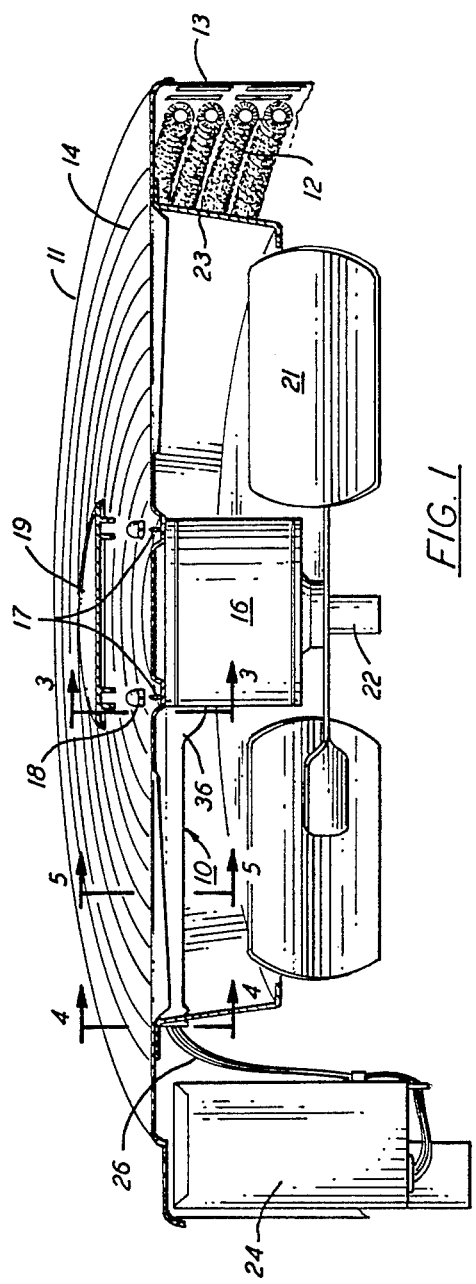
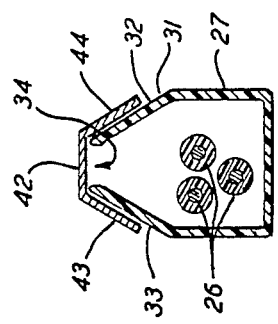
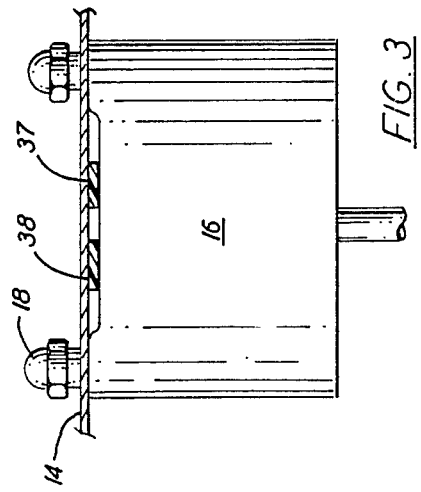

WIRE RACEWAY

BACKGROUND OF THE INVENTION

This invention relates generally to air conditioning systems and, more particularly, to a raceway structure for enclosing electrical wires extending between a drive motor and a control device therefor.

A split system air conditioning or heat pump system includes an outdoor heat exchanger coil through which air is either blown or drawn in order to transfer heat either to or from the refrigerant in the coil. For that purpose, it is common to suspend the fan drive motor from a central-portion of a top frame member or grill such that the fan is centrally located in the top portion of the coil. Since the controls for the fan motor are normally located on one side of the coil enclosure, it is necessary to interconnect the control device to the electric motor by way of a plurality of wires. In order to ensure the integrity of these wires, it is common practice to enclose them in an elongate raceway which is conventionally attached to the top frame member by way of fasteners or the like. The protective raceway structure is commonly made of sheet metal and comprises more than one piece. Installation of the wire into the raceway is normally accomplished by lacing it through the tube-like structure, from one end to the other, either before or after the raceway is fastened to the frame. The Applicant has recognized that such a multiple piece is cumbersome, time consuming, and expensive to assemble. It also exposes the wire to the possibility of being pinched and to thereby cause a short circuiting of the system.

It is therefore an object of the present invention to provide an improved wire raceway structure for an air conditioning system.

Another object of the present invention is the provision in a outdoor coil assembly for installing a wire raceway in an economical and efficient manner.

Yet another object of the present invention is the provision for simplifying the structure of a wire raceway member.

Still another object of the present invention is the provision in an air conditioning system for reducing the number of parts in a wire raceway structure.

Yet another object of the present invention is the provision for a wire raceway which is economical to manufacture, easy to install, and effective in use.

These objects and other features and advantages become more readily apparent upon reference to the following description when taken in conjunction with the appended drawings.

SUMMARY OF THE INVENTION

Briefly, in accordance with one aspect of the invention, an elongate, unitary raceway is formed of a lower enlarged portion and an upper converging portion, which defines at its upper end an elongate gap which, when the upper portion is in the unflexed condition, has a width less than the diameter of the wire, and which, when that portion is in its flexed position, has a width which is equal to or greater than the diameter of the wire so as to thereby allow its insertion through said expansible portion and into said enlarged portion to be retained.

By another aspect of the invention, the ends of the raceway member are formed to mate with associated parts in the frame of the air conditioner system such that it can be mounted to said frame without separate fasteners.

By yet another aspect of the invention, the wire raceway is mounted in an aligned underlying relationship with a channel in the system frame such that the defined gap is covered to restrict the entrance of rain and the like.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a partial cutaway view of the top portion of an outdoor coil unit having the present invention incorporated therein.

FIG. 3 is a cross-sectional view of the wire raceway as seen along lines 313 3 of FIG. 1.

FIG. 5 is a cross-sectional view of the wire raceway as seen along lines 5—5 of FIG. 1.

DESCRIPTION OF THE PREFERRED EMBODIMENT

Figure 2:
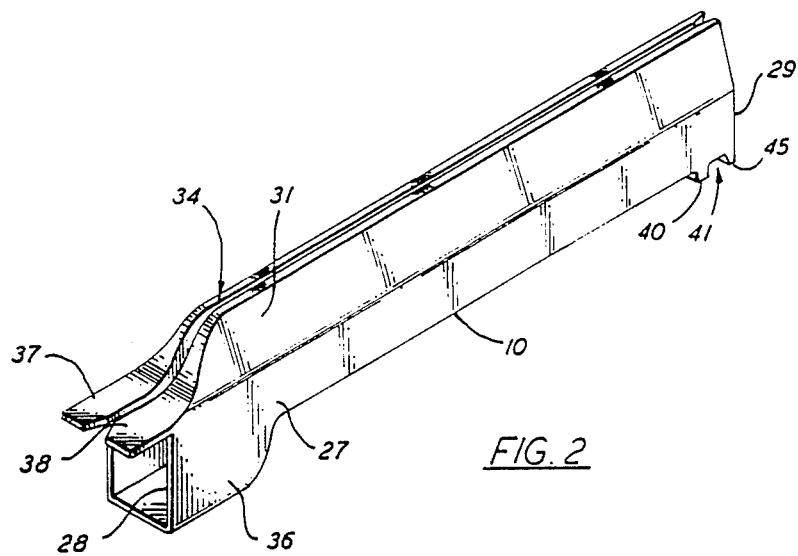
FIG. 2 is a perspective view of a wire raceway member in accordance with the present invention.

Referring now to FIG. 1, the wire raceway member is shown at 10 as installed in an outdoor coil unit 11 having a three sided coil 12 enclosed within a louvered grille housing 13 around its outer periphery and a top grille cover 14. Attached to and suspended from a central portion of the top grille cover 14 is a fan motor 16 which is secured by way of a plurality of bolts 17 and nuts 18. A top cap 19 may be installed to cover the nuts 18.

The motor 16 drives a propeller fan 21 which is attached to its shaft 22 in such a way that the air is drawn radially inwardly through the coil 12 and then upwardly to be discharged through the top grille cover 14. A frusto conical shaped orifice ring 23 is secured by way of fasteners (not shown) to the underside of the top grille 14 and extends downwardly in surrounding relationship with the propeller fan 21 to act as a guiding orifice for the movement of air that is discharged from the propeller fan 21.

The motor 16 is designed to be turned on and off at prescribed times determined by certain predetermined parameters such as desired temperatures, ambient temperatures, and predetermined operating schedules. The control mechanism which controls this operation is contained in a control box 24 mounted at one side of the unit not surrounded by coil 12 and electrically connected to the motor 16 by way of a plurality of wires 26. The wires 26 thus extend from the control box 24, into one end of the wire raceway member 10, out the other end of the wire raceway 10 where it is then connected to the motor 16. The three wires are commonly for positive, negative, and ground connections, respectively.

Figure 4:
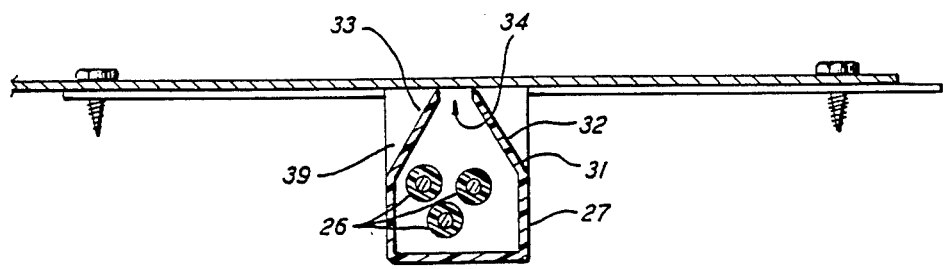
FIG. 4 is a cross-sectional view of the wire raceway as seen along lines 4—4 of FIG. 1.

The wire raceway member 10 is better shown in FIG. 2 and comprises an enlarged, U-shaped, lower portion 27 which is large enough to freely contain the three wires 26 which extend along its length and out the ends 28 and 29 where they connect to the motor and control box, respectively. The top portion 31 of the raceway member 10 has a pair of converging sides 32 and 33 which form an elongate slot 34 at their upper ends. It will be seen in FIGS. 4 and 5 that the width of the slot 34 is normally less than the diameter of the wire sections 26 such that, once installed, the wires will tend to remain in the raceway member. In order to initially install them, however, the flexible sides 32 and 33 allow for the two sides to be spread apart such that the width of the slot 34 is sufficiently large to allow the wire sections to be easily inserted. Also, the wider slot width at the two ends allows easy insertion of wires into slot 34. The sides 32 and 33 are then allowed to spring back to their initial positions as shown in FIGS. 4 and 5. In this way, the wires can be easily installed without the usual lacing method, and once installed, they remain in their installed positions.

The raceway member can be made of any suitable material, a preferred material being a plastic, fire retardant material which is blow moldable as a single piece.

At the one end 28 of the raceway member 10, near the motor 16, there is a downwardly extending portion 36 having an end which abuts against the side of the motor as shown in FIG. 1. On the top side of that end there are a pair of spaced tongues 37 and 38 which extend outwardly from the end 28 such that they can be inserted between the top grille cover 14 and the motor 16 as shown in FIG. 3. In this way, the motor 16 provides the vertical support for that end of the raceway 10, and the top grille cover 14.

At the other end of the raceway member 10, the vertical support is provided by way of the orifice ring 23 which has a rectangular notch 39 (see FIG. 4) formed therein. Resting on the lower edge of the notch 39 (i.e. the upper edge of the orifice ring at that point), is a U-shaped notch 41 formed in the bottom of the raceway member 10. The U-shaped notch 41, which is defined by a pair of spaced, downwardly extending ridges 40 and 45, simply rests on the edge of the notch 39, with the sides of the notch 39 then holding the raceway member from moving in the lateral direction. The top cover 14, of course, prevents the movement of the raceway member end 29 from the notch 39 in the vertical direction.

Since the top grille cover 14 is generally of a light structure with most of it being open to facilitate the flow of air therethrough, the open slot 34 disposed thereunder would normally be susceptible to the inflow of rain, snow and the like. However, as will be seen in FIG. 5, the structure of the top grille cover at that radial position is so designed as to prevent this. The grille cover 14 includes a radially extending rib 42, and included on each side thereof is a downwardly extending side, designated at 43 and 44, which overlap the upper sides 33 and 32 of the raceway member 10, in generally parallel relationship, such that the three-sided structure of the top grille cover 14 acts as a cover for the opening 34 in the raceway member 10 to prevent the inflow of moisture thereto.

The installation of the raceway member 10 and the included wires will typically be installed as follows. The motor and fan assembly are first attached to the central location under the top grille cover 14. The wires 26 are then inserted into the slot 34 and the tongues 37 and 38 at the one end of the raceway member 10 are inserted in the space between the top grille cover 14 and the motor 16. The raceway member 10 is aligned, in the appropriate radial direction, so as to be directly under the three-member cover structure as described hereinabove. The orifice 23 is then brought into place, with its rectangular notch 39 being selectively placed so as to contain the other end of the raceway member 10. As the orifice ring is fastened in place, the lower edge of the rectangular notch then secures the raceway member 10 in its fixed position.

While the present invention has been disclosed with particular reference to a preferred embodiment, the concepts of this invention are readily adaptable to other embodiments and those skilled in the art may vary the structure thereof without departing from the essential spirit of the present invention. It is contemplated that such variations are within the scope of the appended claims.

What is claimed is:

1. An improved wire raceway structure of the type which contains a segment of electrical wires extending between a fan motor suspended from a central portion of an air conditioner unit and a control box located at a side wall of the unit comprising:

a U-shaped bottom portion having a width which is substantially greater than a diameter of the wire such that a pair of wires can be contained therein and extend along a length thereof;

a converging top portion integrally connected to said bottom portion and converging inwardly as it extends upwardly to its top end where it defines a longitudinal gap along its length, the width of said gap being normally less than the diameter of the wire to be contained but being temporarily expandable by flexing of said top portion to thereby allow insertion of the wire into the raceway structure; and wherein the raceway structure is mounted between the fan motor and an orifice ring, with the ends of the raceway structure being formed to accommodate attachment to said motor and said orifice ring without separate fasteners.

2. An improved wire raceway structure as set forth in claim 1 wherein the structure is formed of a plastic material.

3. An improved wire raceway structure as set forth in claim 1 wherein said raceway structure is mounted to said motor by way of a pair of spaced tongues extending from a top portion of said raceway structure and extending over a supporting portion of said motor.

4. An improved wire raceway structure as set forth in claim 1 wherein said raceway structure is secured to said orifice ring by way of a notch formed on the lower side of said raceway structure, with said notch being adapted to overlay a portion of said orifice ring in a manner such that it is cradled in place.

5. In an air conditioning system of the type having a motor and a control device mounted separately on a frame structure and being interconnected by electric wires, an improved wire raceway structure comprising:

a unitary member having a means for attaching it to the frame structure and including an enlarged section for containing portions of the electric wires;

an expansible portion integrally connected to said enlarged portion to facilitate insertion of the wire into said enlarged portion and to assist in retention therein, said expansible portion being flexible and defining an opening which, in its unflexed condition, is narrower than a diameter of the electric wires and which, in its flexed condition, is wider than the diameter of the electric wires; and wherein the raceway structure is mounted between the fan motor and an orifice ring, with the ends of the raceway structure being formed to accommodate attachment to said motor and said orifice ring without separate fasteners.

6. The air conditioning system as set forth in claim 5 wherein the wire raceway structure is formed of a plastic material.

7. The air conditioning system as set forth in claim 5 wherein the wire raceway structure is mounted to said motor by way of a pair of spaced tongues extending from a top portion of said raceway structure and extending over a supporting portion of said motor.

8. The air conditioning system as set forth in claim 5 wherein the wire raceway structure is secured to said orifice ring by way of a notch formed on the lower side of said raceway structure, with said notch being adapted to overlay a portion of said orifice ring in a manner such that it is cradled in place.

* * * * *